Figure 1:
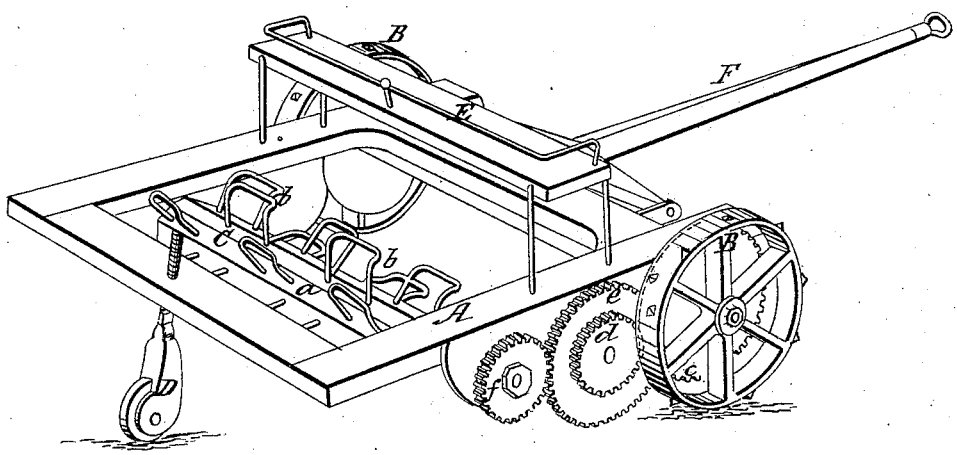
Figure 2:
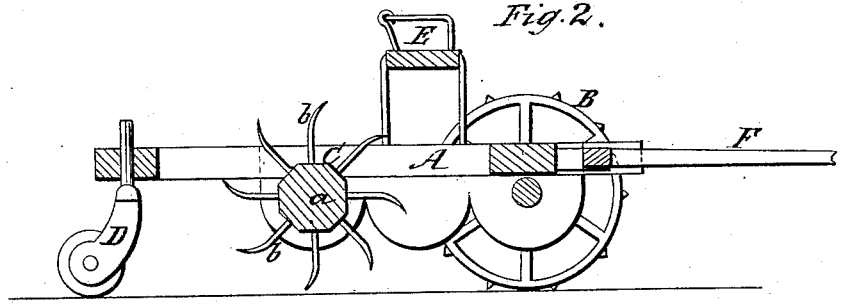

J. JOHNSON.
Rotary Cultivator.

No. 45,249.  Patented Nov. 29, 1864.

UNITED STATES PATENT OFFICE.

JOHN JOHNSON, OF MOUNT WASHINGTON, OHIO.

EARTH-PULVERIZER.

Specification forming part of Letters Patent No. 45,249, dated November 29, 1864.

*To all whom it may concern:*

Be it known that I, JOHN JOHNSON, of Mount Washington, in the county of Hamilton and State of Ohio, have invented a new and Improved Earth-Pulverizer; and I do hereby declare the following to be a full, clear, and exact description of the same, reference being had to the accompanying drawings and letters marked thereon, forming part of this specification.

My said invention relates to the construction and arrangement of the various parts of the implement for pulverizing the earth, as hereinafter described.

The machine consists of a main frame, A, supported at its forward end by traction-wheels B B. These are made with projecting ribs or spikes upon their peripheries to give them a hold upon the ground.

C is a pulverizer, consisting of a stout central shaft, $a$, journaled in main frame A and armed with teeth $b$ of peculiar construction, as represented. These are formed of round or square bars of metal bent into the form of the letter U. The curved part is reduced to an edge and bent in the form represented, so that when the ends are introduced into the central shaft the sharp curved part of the teeth will strike the ground vertically, or nearly so, when the machine is operated.

The shaft or axle of the traction-wheels carries a gear-wheel, $c$, which gears with a small wheel, $d$, on an intermediate shaft, and on the same shaft is a large wheel, $e$, in gear with a smaller wheel, $f$, on the shaft of the pulverizer C, communicating from the drivers or traction-wheels B an increased rotary motion in an appropriate direction thereto.

D is a caster-wheel, the shank of which is screw-cut and enters the after end of frame A, supporting it at an appropriate height from the ground and regulating the depth which the teeth $b$ enter the earth.

E is a driver's seat, and F the tongue of the implement. The latter is pivoted to the frame, as represented, leaving the machine free to follow the undulations of the ground.

The operation of the machine is as follows: It is drawn over the ground with an adequate team of horses or cattle. The traction-wheels B, acting through the gearing $c\ d\ e\ f$, communicate a rotary motion to the pulverizer C somewhat more rapid and in the same direction. The teeth $b$, sharpened and bent in the manner explained, strike the ground vertically, each a short distance forward of the cut made by the preceding tooth, and sever a slice of earth, moving it first back a short distance, and then raising it slightly until it crumbles and falls through and on the outside of the teeth in a pulverized state to the ground. In this operation space is left by the earth removed at each cut, which facilitates the displacement and pulverization of the next cut.

The frame may be weighted sufficiently to give penetration to the teeth and cause the traction-wheels to take a firm hold in the ground.

A roller and planter may be attached to the rear of the frame, if desired.

Having fully described my improved pulverizer, what I claim as new, and desire to secure by Letters Patent of the United States, is the following:

In the construction of the implement herein described, the combination and arrangement of the frame A, pulverizer C, furnished with open teeth $b$, curved in the manner described, traction-wheels B, gearing $c\ d\ e\ f$, and adjustable caster-wheel D, substantially as and for the purposes herein specified.

In witness whereof I have hereunto set my name.

JOHN JOHNSON.

Witnesses:
D. L. REID,
WM. H. CLARK.